United States Patent
Wu et al.

(10) Patent No.: US 10,990,885 B1
(45) Date of Patent: Apr. 27, 2021

(54) DETERMINING VARIABLE ATTRIBUTION BETWEEN INSTANCES OF DISCRETE SERIES MODELS

(71) Applicant: Capital One Services, LLC, McLean, VA (US)

(72) Inventors: Rongwen Wu, McLean, VA (US); Robert Gevorgyan, Rockville, MD (US); Arundeep Chinta, Vienna, VA (US); Zhuowang Li, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/696,628

(22) Filed: Nov. 26, 2019

(51) Int. Cl.
*G06N 5/04* (2006.01)
*G06Q 20/28* (2012.01)

(52) U.S. Cl.
CPC ............... *G06N 5/04* (2013.01); *G06Q 20/28* (2013.01)

(58) Field of Classification Search
CPC .................................. G06N 5/04; G06Q 20/28
See application file for complete search history.

(56) References Cited

U.S. PATENT DOCUMENTS

| | | | |
|---|---|---|---|
| 8,775,291 B1 * | 7/2014 | Mellman | G06Q 40/00 705/36 R |
| 10,158,652 B2 | 12/2018 | Muddu et al. | |
| 2012/0150489 A1 * | 6/2012 | Dhurandhar | G06Q 10/04 702/179 |
| 2017/0337505 A1 | 11/2017 | Chittilappilly et al. | |
| 2018/0052804 A1 * | 2/2018 | Mikami | G06Q 10/063 |
| 2018/0204285 A1 | 7/2018 | Nadler | |
| 2019/0068627 A1 | 2/2019 | Thampy | |
| 2019/0108471 A1 | 4/2019 | Widanapathirana et al. | |

OTHER PUBLICATIONS

Bauso, "Robust Dynamic Cooperative games" (Year: 2009).*
Collins, "Design of Experiments with Multiple Independent Variables: A Resource Management Perspective on Complete and Reduced Factorial Designs", vol. 14, No. 3, p. 202-224 (Year: 2009).*
Joseph, "Shapley regressions: A framework for statistical inference on machine learning models", 2018 (Year: 2019).*
Bauso, "RObust Dynamic Cooperative games", 2009 (Year: 2009).*
Collins, "Design of Experiments with Multiple Independent Variables: A Resource Management Perspective on Complete and Reduced Factorials Design", vol. 14, No. 3, p. 202-224, 2009 (Year: 2009).*
Lundberg, S.M., & Lee, S.-I., A Unified Approach to Interpreting Model Predictions. In Proceedings of the 31st Conference on Neural Information Processing Systems (NIPS 2017), Long Beach, CA, USA; pp. 1-10.
Shapley, L.S., A Value for n-Person Games. Annals of Mathematics Studies No. 28 (1953), Princeton University Press; pp. 307-317.

* cited by examiner

*Primary Examiner* — Ann J Lo
*Assistant Examiner* — Van C Mang
(74) *Attorney, Agent, or Firm* — Sterne, Kessler, Goldstein & Fox P.L.L.C.

(57) ABSTRACT

A method of determining the effect that changes in input variables have on changes in the output of a time series model, between two instances of time, produces variable attributions that satisfy the Shapley fairness properties of efficiency, symmetry, linearity, and null player.

16 Claims, 11 Drawing Sheets

| Players | Score Game 1 | Score Game 2 |
|---|---|---|
| {a} | 50 | 50 |
| {b} | 100 | 125 |
| {c} | 150 | 150 |
| {a, b} | 175 | 225 |
| {a, c} | 250 | 250 |
| {b, c} | 325 | 375 |
| {a, b, c} | 400 | 450 |

FIG. 1

| Weight | Order | a's contribution | b's contribution | c's contribution |
|---|---|---|---|---|
| 1/6 | (a, b, c) | = {a}<br>= 50 | = {a, b} − {a}<br>= 175 − 50<br>= 125 | = {a, b, c} − {a, b}<br>= 400 − 175<br>= 225 |
| 1/6 | (a, c, b) | = {a}<br>= 50 | = {a, b, c} − {a, c}<br>= 400 − 250<br>= 150 | = {a, c} − {a}<br>= 250 − 50<br>= 200 |
| 1/6 | (b, a, c) | = {a, b} − {b}<br>= 175 − 100<br>= 75 | = {b}<br>= 100 | = {a, b, c} − {a, b}<br>= 400 − 175<br>= 225 |
| 1/6 | (c, a, b) | = {a, c} − {c}<br>= 250 − 150<br>= 100 | = {a, b, c} − {a, c}<br>= 400 − 250<br>= 150 | = {c}<br>= 150 |
| 1/6 | (c, b, a) | = {a, b, c} − {b, c}<br>= 400 − 325<br>= 75 | = {b, c} − {c}<br>= 325 − 150<br>= 175 | = {c}<br>= 150 |
| 1/6 | (b, c, a) | = {a, b, c} − {b, c}<br>= 400 − 325<br>= 75 | = {b}<br>= 100 | = {b, c} − {b}<br>= 325 − 100<br>= 225 |
| Attribution | | 425/6 | 800/6 | 1175/6 |

FIG. 2

| Weight | Order | a's contribution | b's contribution | c's contribution |
|---|---|---|---|---|
| 1/6 | (a, b, c) | = {a}<br>= 50 | = {a, b} − {a}<br>= 225 − 50<br>= 175 | = {a, b, c} − {a, b}<br>= 450 − 225<br>= 225 |
| 1/6 | (a, c, b) | = {a}<br>= 50 | = {a, b, c} − {a, c}<br>= 450 − 250<br>= 200 | = {a, c} − {a}<br>= 250 − 50<br>= 200 |
| 1/6 | (b, a, c) | = {a, b} − {b}<br>= 225 − 125<br>= 100 | = {b}<br>= 125 | = {a, b, c} − {a, b}<br>= 450 − 225<br>= 225 |
| 1/6 | (c, a, b) | = {a, c} − {c}<br>= 250 − 150<br>= 100 | = {a, b, c} − {a, c}<br>= 450 − 250<br>= 200 | = {c}<br>= 150 |
| 1/6 | (c, b, a) | = {a, b, c} − {b, c}<br>= 450 − 375<br>= 75 | = {b, c} − {c}<br>= 375 − 150<br>= 225 | = {c}<br>= 150 |
| 1/6 | (b, c, a) | = {a, b, c} − {b, c}<br>= 450 − 375<br>= 75 | = {b}<br>= 125 | = {b, c} − {b}<br>= 375 − 125<br>= 250 |
| Attribution | | 450/6 | 1050/6 | 1200/6 |

| 401 | 402 | 403 | 404 | 405 | 406 |
|---|---|---|---|---|---|
| CUSIP | WAC | ... | Refi_Incent_lag2 | 30yr_Burnout_lag1 | WALA |
| 36200MJ87 | 0.0098 | ... | -0.021 | 0.081 | 0.038 |

FIG. 4

| Date | CUSIP | WAC | ... | Refi_Incent_lag2 | 30yr_Burnout_lag1 | WALA |
|---|---|---|---|---|---|---|
| 2004/01 | 36200MJ87 | 0.0098 | ... | -0.021 | 0.081 | 0.038 |
| 2006/01 | 36200MJ87 | 0.0037 | ... | -0.021 | 0.033 | 0.024 |

FIG. 5

| Combination | Simulated pair of instances | Weight |
|---|---|---|
| 1 | {a0, b0, c0, d0}<br>{a1, b0, c0, d0} | 3! |
| 2 | {a0, b1, c0, d0}<br>{a1, b1, c0, d0} | 2! |
| 3 | {a0, b0, c1, d0}<br>{a1, b0, c1, d0} | 2! |
| 4 | {a0, b0, c0, d1}<br>{a1, b0, c0, d1} | 2! |
| 5 | {a0, b1, c1, d0}<br>{a1, b1, c1, d0} | 2! |
| 6 | {a0, b1, c0, d1}<br>{a1, b1, c0, d1} | 2! |
| 5 | {a0, b1, c1, d0}<br>{a1, b1, c1, d0} | 2! |
| 6 | {a0, b1, c0, d1}<br>{a1, b1, c0, d1} | 2! |
| 7 | {a0, b0, c1, d1}<br>{a1, b0, c1, d1} | 2! |
| 8 | {a0, b1, c1, d1}<br>{a1, b1, c1, d1} | 3! |

FIG. 6

$$\Phi_j(x_{t_0}, x_{t_1}) = \sum_{m \in \{0,1\}^{p-1}} \frac{|m|!(p-|m|-1)!}{p!} [\hat{f}(z(m_{\{j=1\}})) - \hat{f}(z(m_{\{j=0\}}))]$$

- 701: Attribution for the variable j
- 702: Average out the contributions of all simulated instances
- 703: Contribution for the variable j to the prediction change for the simulated combination
- 704: Normalized weight of the simulated instance
- The instance with the value for variable j same as $x_{t_1}$
- The instance with the value for variable j same as $x_{t_0}$

DETERMINING VARIABLE ATTRIBUTION BETWEEN INSTANCES OF DISCRETE SERIES MODELS

BACKGROUND

Data analysis is becoming increasingly important as a driver of economic growth and a tool for addressing highly complex systems that are beyond the capacity of human minds to understand. The ability to predict outcomes in a world saturated with data increasingly depends on our ability to create and interpret models of the real world. Models may be used to simplify and predict the output of complex systems. The usefulness of a model depends both on the model's accuracy and interpretability.

However, as more data become available, and the relationships between data inputs and outputs become increasingly complex, simple models may not be able to make accurate, and therefore useful, predictions. Machine learning models may be used to predict complex systems with higher accuracy, but this increased accuracy comes with decreased interpretability. Even when a model is highly accurate, if it cannot be interpreted, it becomes difficult to determine what inputs should be adjusted in order to achieve a desired result in the real world. In order to be useful, a model must be able to show not only what happens in a system, but why it happens. Interpretability relates to how clearly that "why?" question is answered. Interpretability is key to validating machine learning models, ensures models are generating the correct answers for the correct reasons, and offers insights into debugging the models and engineering new features.

Modern neural network machine learning models may have thousands of inputs, and hidden layers between the inputs and outputs, making it difficult to determine why changes in certain inputs produce corresponding changes in the outputs. Highly complex models, including neural networks, may be viewed as a "black box" for which the inputs and outputs are visible but the internal details are a mystery. Therefore, simpler and less accurate models are often used, even when more accurate models are available, because they are easier to interpret. While machine learning algorithms have progressed significantly, there is not yet a solidified industry approach for unlocking the black box.

BRIEF SUMMARY

A method of determining a target variable's attribution to a prediction change between two instances, t0 and t1, of a discrete series model including the target variable and one or more dynamic variables that change between t0 and t1, comprises: determining a value corresponding to t0 and a value corresponding to t1 for each dynamic variable in the discrete series model; selecting a value, a0, of the target variable corresponding to t0 and selecting a value, a1, of the target variable corresponding to t1; generating all combinations of values for the one or more dynamic variables by setting each dynamic variable to either the value corresponding to t0 or the value corresponding to t1; for each combination of dynamic variable values, determining a difference between a prediction of the discrete series model using the value a0 for the target variable and a prediction of the discrete series model using the value a1 for the target variable; and averaging the differences to obtain the target variable's attribution.

The time series model may include one or more static variables that do not change between t0 and t1 and the method may further comprise excluding, from the generating of all combinations, static variables that do not change between t0 and t1.

The averaging may comprise: weighting each difference; and summing the weighted differences to obtain the target variable's attribution.

The weighting of each difference may comprise weighting each difference such that: the sum of all variable attributions is equal to the prediction change between t0 and t1; two variables with equal contribution to the discrete series model prediction for all combinations have equal attributions; the sum of a variable's attributions in two or more models is equal to the attribution for the sum of the two or more models; and attribution of a variable is zero when a change in the variable contributes zero change to the prediction of the discrete series model.

The method applies to discrete series models and time series models. A computer-readable medium of a disclosed embodiment stores instructions that, when executed by a processor, cause the processor to perform the steps of any of the methods described. A system configured according to a disclosed embodiment comprises a memory configured to store computer-readable instructions and a processor configured to read the computer-readable instructions and perform the steps of any of the methods described.

A method of determining a target variable attribution corresponding to a change in output of a discrete series model including two or more dynamic variables that vary between two instances, t0 and t1, comprises: generating a set of combinations including every possible combination of values for the one or more dynamic variables, where a value for each dynamic variable is selected from a value of the dynamic variable corresponding to instance t0 or a value of the dynamic variable corresponding to instance t1; selecting a target variable from among the two or more dynamic variables; for each pair of combinations that differ only in the value of the target variable, determining a difference between a first instance, where the target variable takes a value from instance t0, and a second instance, where the target variable takes a value from instance t1; averaging the differences between the first instance and the second instance across all pairs of combinations to determine the target variable attribution.

One non-limiting example use case of the above methods may include identifying a magnitude of the effect that certain variables have on changes in a machine learning model's predicted prepayment rate for pooled debt securities. A method of determining an effect, on a prediction of a time series model of pooled debt securities, of a change in a target variable between two instances, t0 and t1, the model including the target variable and one or more dynamic variables that change between t0 and t1, comprises: determining a value corresponding to t0 and a value corresponding to t1 for each dynamic variable in the time series model. The method may include selecting a value, a0, of the target variable corresponding to t0 and a value, a1, of the target variable corresponding to t1. The change in the target variable may comprise the difference between a0 and a1. The method may comprise generating all combinations of values for the one or more dynamic variables by setting each dynamic variable to either the value corresponding to t0 or the value corresponding to t1. For each combination, the method may include determining a difference between a first predicted prepayment of the time series model using the value a0 for the target variable and a second predicted prepayment of the time series model using the value a1 for the target variable. The differences between the first predicted prepayment and the second predicted prepayment for each combination may be averaged to obtain the effect of the change in the target variable.

The time series model may include one or more static variables that do not change between t0 and t1 and the method may exclude, from the generating of all combinations, static variables that do not change between t0 and t1.

The averaging of the differences between the first predicted prepayment and the second predicted prepayment may comprise weighting each difference and summing the weighted differences to obtain the effect of the change in the target variable. This effect may be called the target variable attribution.

The weighting of each difference comprises weighting each difference such that: the sum of the effect of the change in the target variable and effects of changes in each of the one or more dynamic variables is equal to the total change in predicted prepayment between t0 and t1; if the contribution of two variables is the same for all combinations, then these two variables have equal attribution; the sum of any variable's effects, in two or more time series models, is equal to the effect of that variable for the sum of the two or more time series models; and the effect of the target variable is zero when a change in the target variable produces zero change in the predicted prepayment of the time series model.

BRIEF DESCRIPTION OF THE DRAWINGS/FIGURES

The accompanying drawings are incorporated herein and form a part of the specification.

FIG. 1 is a chart, presented only to illustrate an application of the Shapley method, showing scores for each combination of players who participate in two different cooperative coalition games.

FIG. 2 is a chart showing how attribution for each player in a cooperative game is computed according to the Shapley method.

FIG. 3 is a chart showing how attribution for each player in a cooperative game is computed according to the Shapley method.

FIG. 4 is a chart showing variable attributions calculated, according to the Shapley method, for some non-limiting example variables in a mortgage backed security.

FIG. 5 is a chart showing variable attributions calculated, according to the Shapley method, for some non-limiting example variables in a mortgage backed security at two different instances of time.

FIG. 6 is a chart illustrating a method of determining variable attributions for a difference in model output between two time instances, according to embodiments disclosed herein.

FIG. 7 is a diagram of a generalized mathematical formula for determining variable attributions in time series models or discrete series models, according to embodiments disclosed herein.

In the drawings, like reference numbers generally indicate identical or similar elements. Additionally, generally, the left-most digit(s) of a reference number identifies the drawing in which the reference number first appears.

DETAILED DESCRIPTION

Figure 8:
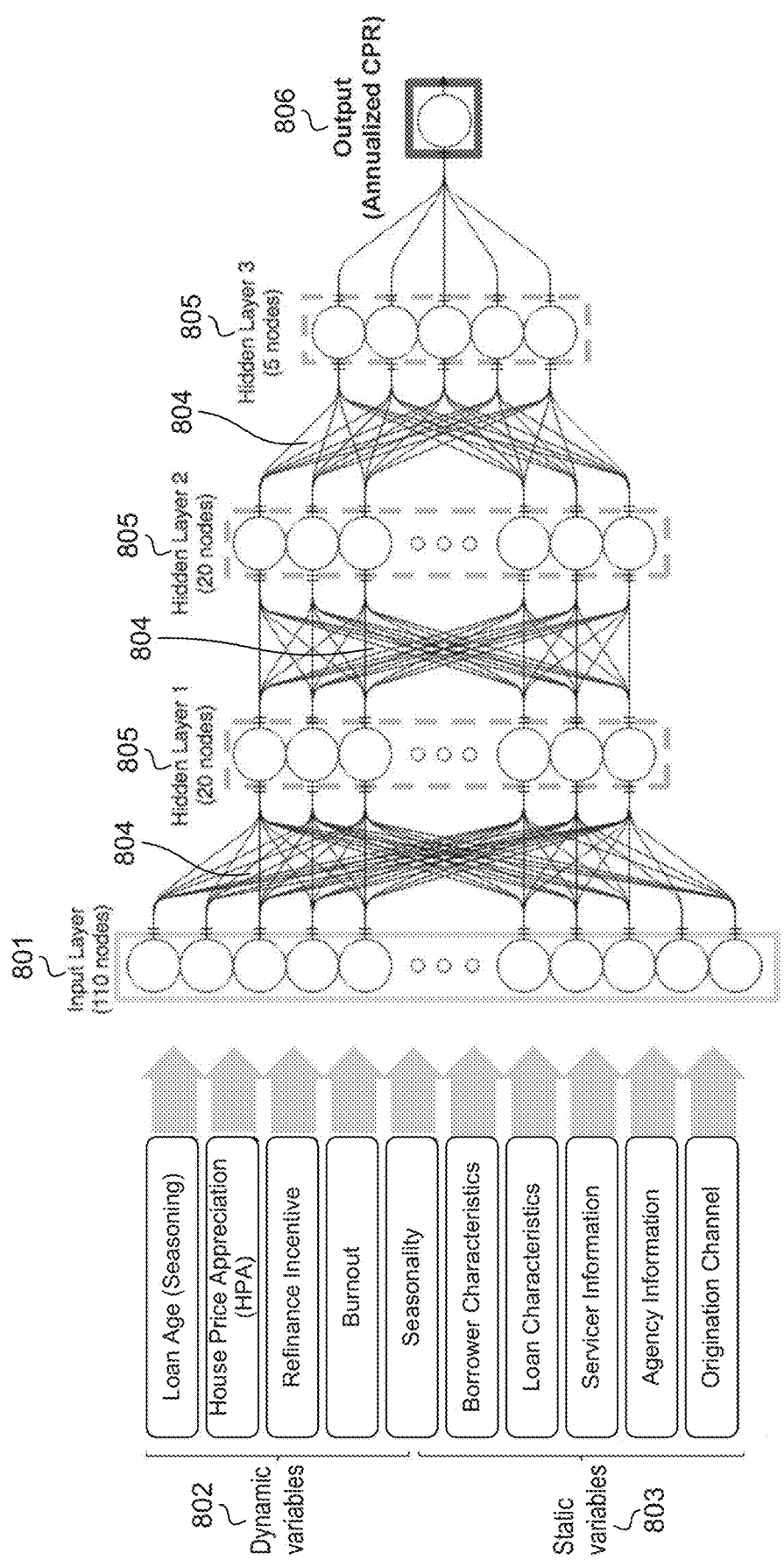
FIG. 8 is a diagram of a neural network machine learning model with hidden layers and complex interactions between variables for illustrating an application of the embodiments disclosed herein.

Models are representations of real-world systems or phenomena, which are useful in predicting outcomes when inputs to the model are manipulated. Models can help us to predict the behavior of complex systems, both natural and man-made. In banking, models may be used in, for example, interest rate risk, Funds Transfer Pricing (FTP), Comprehensive Capital Analysis and Review (CCAR), outlook, retail and commercial deposit pricing & strategy Machine Learning (ML). Models may be applied to, for example, valuation of an investment portfolio, forecasting behaviors of assets and liabilities on a balance sheet, including retail and commercial deposits, investment portfolio, auto and commercial loans, mortgage prepayment, text mining, and customer level deposit analysis.

Variable attribution is a quantified indication of a variable's influence on the prediction, or output, of a model. A variable attribution may be specific to a particular set of instances of a discrete series model or time series model and, for purposes of this application and the embodiments disclosed herein, quantifies a relationship between changes in the variable and resulting changes in the output of the model. Determining variable attribution is one way of interpreting a model.

The usefulness of a model depends both on the model's accuracy and interpretability. Because the real world is complex, more accurate models are often more complex. Part of the complexity of models comes from interactions between variables. Variables in a model may influence predictions of the model indirectly, through complex interactions with other variables of the model. This complexity makes the model difficult to interpret.

Coalitional game theory provides an example of complex interactions between variables. In a coalition game, the variables may be viewed as players in a cooperative game; multiple players form a coalition and work cooperatively to achieve some result. This result may be a number of points in a competitive sports game, profits from a business endeavor, or even an amount of food obtained by a hunting/gathering party. The question that arises is how to allocate the result (e.g., points, money, or food) in a fair way among the players. One answer to this question was proposed by Lloyd Shapley. See Shapley, L. S. (1953). A value for n-person games. In *Annals of Mathematics Studies No. 28* (pp. 307-317). The Shapley model provides a method of attributing a marginal value to each of the underlying variables or players in a cooperative game. The Shapley method does not work for discrete series models, but understanding the Shapley method may help to illuminate the novelty of the disclosed embodiments.

A cooperative sports game can be used to illustrate the Shapley method. In this made-up game, a team of players, a, b, and c, work together to defeat an opposing team and win a cash prize. The question is how to distribute the cash prize among the players in a way that fairly represents each player's contribution to the victory. A model, f (x), represents outcomes of the game given each individual player's contribution, or input, to the game. The output of that model is represented in FIG. 1, which has three columns. The first column, labeled "Players" 101, identifies the players on a modeled team. The second column 102 shows the score for that configuration of one or more players in game 1 and the third column 103 shows the score for that configuration of players in game 2. Only game 1 is considered for now.

For purposes of this discussion, sets, where order does not matter, will use curly brace notation, for example {1, 2, 3, . . . } and sequences, where order matters, will use parentheses notation, for example (c, b, a). As shown in FIG. 1, there are seven possible combinations of players for which the model provides a score. These combinations are indicated by the letters inside the curly braces and include: each player alone, three possible combinations of two players, and the three-player team as a whole. The output of the model in FIG. 1 shows that when each individual player participates in the game alone, player a scores 50 points, player b scores 100 points, and player c scores 150 points. The score is zero when there are zero players.

Complex interactions between players result in the players working together to score higher than the sum of their individual scores. This is illustrated, for example, in the scores of player a and player b: the sum of {a} and {b} is 150, but the score for the team {a, b} is 175, 25 points higher. Similarly, the sum of {b} and {c} is 250, but the score for team {b, c} is 325, 75 points higher. The model, f̂(x), reflects the differences in synergy achieved by different combinations of players. The complex interactions between players on a team are not readily apparent, making the model of the players' performance difficult to interpret. This interpretation difficulty translates to difficulty in determining how to fairly allocate the cash prize among players so that it matches their proportional contribution to the final score. Simply splitting the cash prize between each player according to their individual contributions would ignore the synergistic contributions of the players. The Shapley method, illustrated in FIG. 2, provides one solution to this problem.

Referring to FIG. 2, the Shapley method determines player a's contribution to the final score of game 1. The general approach is to combine and average all marginal contributions of player a. The second column, labeled "Order" 202, shows the six different orders 202 in which team members can be added to assemble a three-person team. The calculations for determining player a's contributions 203 corresponding to each order 202 are described in the column labeled "a's contributions" 203. The weight 201 given to each order 202 when calculating the average of a's contributions 203 is given in the column labeled "Weight" 201. There are six different orders 202 in which player a can be added to the team {a, b, c}, meaning each possibility gets a weight of ⅙ when determining the average contribution, as shown in the Weight 201 column. Player b's contributions 204 and player c's contributions 205 are shown in the remaining columns. This example will focus on contributions of player a.

In situations where player a is added to an empty team, the marginal contribution is merely the score for {a} from FIG. 1. For all other situations, the marginal contribution is determined by the score difference when player a is added to a team with one or more players. For example, the marginal contribution of player a on team {a, b} is the difference between the score for team {a, b} and the score for player b alone:

$$\hat{f}(a) = f(\{a,b\}) - f(\{b\})$$

$$= 175 - 100$$

$$= 75$$

Based on FIG. 1, player a makes a marginal contribution of 50 points to the final score when considered alone, or added first. Note that there are two possible orders in which player a can be added first to the team: a first, b second, and c last (a, b, c); and a first, c second, and b last (a, c, b). Therefore, player a's solo contribution of 50 points is considered twice, once for each order of building the team where a is added first. Similarly, there are two orders in which player a is added last. However, because there are already players on the team, player a's marginal contribution to the final score is determined by subtracting the score for the team without player a, i.e., team {b, c}, from the score for the team {a, b, c}.

$$\hat{f}(a) = f(\{a,b,c\}) - f(\{b,c\})$$

$$= 400 - 325$$

$$= 75$$

When all contributions of player a, in each possible order of building a team of three players, are calculated in the above manner and averaged, player a's total contribution is 425/6. This averaged sum is called a Shapley value, and represents the attribution 206 of player a in the outcome of game 1. Shapley values are one way of representing variable attribution 206. One property of the Shapley values generated by the Shapley method is that the sum of all player's contributions is equal to the total point value for the team. This property of Shapley values is called efficiency.

Efficiency means that the sum of attributions for all players, or variables, is equal to the outcome of the game, or output of the model, when all those players participate. FIG. 2 provides an exemplary illustration of the property of efficiency. In FIG. 2, player a's attribution is 425/6, player b's attribution is 800/6, and player c's attribution is 1175/6. The sum of Shapley values, or attributions, for player a, player b, and player c is 400, which is the total score 104 for team {a, b, c} in game 1.

$$\frac{425 + 800 + 1175}{6} = 400$$

The Shapley values also have three other useful properties: symmetry, linearity, and null player.

Symmetry refers to equal treatment of equals, which means that two different players or variables, which have the same contributions for all combinations will have the same attribution 206. To illustrate this, consider two additional "bench" players in game 1, player d and player e. Suppose when player d is added to the team {a, b, c}, player d's contributions in all possible combinations of players from {a, b, c, d} are the same as player e when player e is added form team {a, b, c, e}. The Shapley method ensures that when the contributions of player d in {a, b, c, d} are equivalent to the contributions of player e in {a, b, c, e}, player d and player e will also have equal attributions 206.

Linearity means that if a variable has attributions in two games, or models, then the sum of those attributions is equal to the same variable's attribution when the two games, or models, are combined. One illustration of this may be found in examining game 1 and game 2 in FIG. 1. The attribution 5 of player a in game 1 is 425/6 and the attribution 301 of player a in game 2, illustrated in FIG. 3, is 450/6. These attributions sum to 875/6, which is the attribution of player a when calculated using the Shapley method on the sum of scores for each player combination in game 1 and game 2. The property of linearity is actually stronger than this because there is no requirement that the models represent the same game, but the example is given only to illustrate the property of linearity.

Null player means that a player or variable with zero contributions has an attribution of zero. To illustrate this property consider a new player f is added to the team in game 1, but in every possible combination including f, the score is no different than if f were left out; player f is a null player.

The above attributes of using Shapley values for variable attribution make the Shapley method useful for a variety of situations that cannot be listed here. The classic example is the airport runway example. Suppose a number of airline operators plan to use a new airport, but each airline has different sized airplanes requiring different length runways. The airlines requiring short runways do not want to pay extra for a longer runway they don't need, but there are cost savings available if a longer runway is shared among all airlines using the airport. The allocation of cost savings, reflected in how much each airline is charged for use of the runway, can be done fairly by using the Shapley method. Each airline pays a different amount to use the runway, according to the size of their airplanes and every airline pays less than they would without cooperation.

As useful as the Shapley method is, it has limitations. To illustrate one of these limitations, consider the example of game 2 in FIGS. 1 and 3. In real life, the performance of a particular player might vary from game to game. In the same manner, the values of variables that affect the outcome of a complex system, such as the weather or the stock market, may change from time to time. One of the useful properties of a model is that it can be used to predict what might change in the outcome when certain variable inputs change. Referring to FIG. 1, game 2 illustrates a change in the performance of player b in game 2. Relative to game 1, player b's performance has increased both on an individual basis and in all combinations with other players. Notice that the score of game 2 for any combination without player b remains the same as game 1. You might expect that because the performance of player a and player c remained constant, their attribution in the game would be equal to game 1. However, referring to FIG. 3, this is not the case.

As expected, the attribution of player b has increased from 800/6 to 1050/6, but the attributions of player a and player c have also increased. This might be acceptable behavior of the Shapley method when interpreting models where the complex interactions between variables, or players, reflect synergy from cooperation. After all, when cooperation between players produces a higher score, it makes sense to attribute some of that extra value to each of the players who cooperated to produce the higher score. However, this is not true in all cases.

Models are often used to predict how outcomes change over time. These models operate on both static and dynamic variables. Dynamic variables may change from one time to another, though not necessarily, and static variables are inherently fixed. Static variables influence the outcome of a model, but it doesn't make sense for a static variable's attribution to change in response to a change in one of the dynamic variables.

Consider, for example, a model that outputs a predicted prepayment in a pool of debt securities based on both static and dynamic variables. The dynamic variables in this model may fall into categories such as loan age, House Price Index (HPI), rate incentive (a difference between current rates and rates at the time of origination), burnout (missed refinancing opportunities), and seasonality (e.g., home sales increase during the summer). Some dynamic variables that fall into these categories along with their attribution, calculated using the Shapley method, are shown in FIG. 4. Refi_Incent_lag2 404 relates to rate incentive, 30 yr_Burnout_lag1 405 relates to burnout, and WALA (Weighted Average Loan Age) 406 relates to loan age. Each of these dynamic variables may have an effect on the prepayment rate predicted by the model. Static variables may include Weighted Average Coupon (WAC) 402, which reflects the interest rates in the pool of debts behind the securities at the time the securities were issued. Other variables 403 may also be included in the model but, for purposes of this example, it is not necessary to consider them. CUSIP 401 stands for Committee on Uniform Security Identification Procedures and can be viewed simply as an identifier for purposes of this example.

The WAC 402 in this example sets a baseline from which changes in the interest rates in the pool may be measured. The WAC 402 is therefore related to other variables, but its value remains constant by definition. When a change in a dynamic variable occurs, the attribution for the static variable WAC 402 is not expected to change.

Referring now to FIG. 5, the variable attributions for the prepayment model are computed using the Shapley method at two different times. Some of the dynamic variables have changed between time 0 501 and time 1 502, and this change has led to a change in attribution for WAC. This result is not only counter-intuitive, it interferes with interpretation of the model. In the example illustrated in FIGS. 4 and 5, the Shapley method attributes changes in the model prediction to variables that do not change and fails to properly attribute changes in outcome to the variables that actually change. The Shapley method is simply not well-suited for time series models. A different approach, one which more clearly describes how changes in the model predictions between two time points can be attributed to changes in dynamic variables between those time points, is needed.

Variable Attribution for Time-Series (VATS) is presented as an alternative to the Shapley method for use in discrete series applications. A system model, x, with four variables $\{a, b, c, d\}$ provides an example for illustrating the VATS method. Although each of a, b, c, and d are dynamic variables, for purposes of this illustration, variable a is identified as the target variable for which attribution is determined, and variables b, c, and d are identified as dynamic variables. The target variable and the dynamic variables each have a value corresponding to a time t0, $x0=\{a0, b0, c0, d0\}$, and a value corresponding to a time t1, $x1=\{a1, b1, c1, d1\}$. VATS provides a method of describing the attribution of the target variable to the prediction change between instances $x0=\{a0, b0, c0, d0\}$ and $x1=\{a1, b1, c1, d1\}$.

Unlike the Shapley method, where attribution refers to the effect each variable has on the outcome of a particular instance, or game, VATS determines attribution of variables to a change in prediction between two times. The implications of this difference will become more clear in the explanation that follows.

Referring to FIG. 6, variable a is the target variable for which attribution is determined. The three remaining dynamic variables can take on one of two possible values, producing a total of $2^3=8$ different combinations 603. For each combination, there are two instances: a first instance 601 in which the target variable a takes on the value a0 corresponding to t0, and a second instance 602 in which the target variable a takes on the value a1 corresponding to t1. The only difference between the two instances of each combination is the value of the target variable, variable a. In the VATS method, the differences between these two instances, for all 8 combinations, are summed, weighted, and averaged to produce a final attribution for the target variable. This final attribution is a quantified representation of the effect that the change in that variable has on the change in the predicted outcome of the model.

The weighting of each pair of instances for the eight combinations is shown in the "Weight" column 604. As shown, combination 1 605 and combination 8 606 both have weights of three factorial (3!) while the remaining combinations have weights of two factorial (2!). This is because, for combinations 1 and 8, three values come from the same instance, while for other combinations, two values are from the same instance.

One significant benefit of the VATS method, over the Shapley method, is that variables that do not change between t0 and t1 necessarily have an attribution of zero. To illustrate this, consider each pair of instances illustrated in FIG. 6. If the value of the target variable did not change between t0 and t1, then a0=a1. This would mean the difference for every pair of instances in FIG. 6 is zero and the attribution of the target variable is, therefore, zero. Not only does this improve the interpretability of time series models and bring extra business insights, this feature of VATS has the added benefit of eliminating the need to calculate attributions for variables that did not change between t0 and t1. When calculating attributions for all variables in a model, the single largest component of computational complexity increases exponentially by $2^n$, where n is the number of variables. Therefore, the compute time is reduced by about half for every static variable that can be ignored. Some complex models may have hundreds or even thousands of variables, many of which are static. Eliminating the need to compute attributions for static variables between two time instances dramatically reduces the time required for computation.

In addition to the improved interpretability of time series models and reduced computational complexity, attributions determined using the VATS method may satisfy the properties of efficiency, symmetry, linearity, and null player discussed above in relation to the Shapley method. These properties will become apparent in the more detailed description of the VATS method that follows.

The VATS method can be expressed in the formula:

$$\Phi_j(x_{t_0}, x_{t_1}) = \sum_{m \in \{0,1\}^{p-1}} \frac{|m|!(p-|m|-1)!}{p!} [\hat{f}(z(m_{\{j=1\}})) - \hat{f}(z(m_{\{j=0\}}))]$$

Referring to FIG. 7, the attribution 701 for a target variable, indicated by the subscript j, is expressed as $$\Psi_j(x_{t_0}, x_{t_1})$$

where j is the index of the target variable, $x_{t_0}$ is the model instance at t0 and $x_{t_1}$ is the model instance at t1. The average 702 of contributions for all possible combinations of variable values is represented by the summation $$\sum_{m \in \{0,1\}^{p-1}}$$

where p is the number of dynamic variables and $m \in \{0,1\}^{p-1}$ is a binary mask of p−1 elements where each element takes a value 0 or 1. Because one of the dynamic variables will have fixed values for t0 and t1, the remaining dynamic variables for which values are selected from $x_{t_0}$ or $x_{t_1}$ is p−1. Here, the binary mask uses power set notation to include all combinations of 0s and 1s that are possible with p−1 elements. The binary mask lets us denote $z(x_{t_0}, x_{t_1}, m)$ as an instance of the model with values selected from: $x_{t_0}$ for the variables with mask value 0; and $x_{t_1}$ for the variables with mask value 1. Referring to FIG. 6, where p=4, this notation would concisely describe the 8 possible combinations of values the dynamic variables can take from t0 or t1.

The difference 703 between two instances of the model where the j-th variable (the target variable) takes the value from t0 in the first instance and the value from t1 in the second instance is expressed by $$[\hat{f}(z(m_{\{j=1\}})) - \hat{f}(z(m_{\{j=0\}}))]$$

where $\hat{f}()$ represents the output of the model for an instance z(m). For notation simplicity, $x_{t_0}$ and $x_{t_1}$ are omitted, and $z(x_{t_0}, x_{t_1}, m)$ is written as z(m), where the subscript {j=1} indicates the instance where variable j, the target variable, takes on the value from $x_{t_1}$ and the subscript {j=0} indicates the instance where the target variable takes on the value from $x_{t_0}$. Note that if $x_j$ is a static variable, $x_{t_0}=x_{t_1}$, $z(m_{\{j=1\}})$ is the same as $z(m_{\{j=0\}})$, and the VATS attribution is zero which means that there is no need to calculate it.

The weighting 704 of each instance is described by $$\frac{|m|!(p-|m|-1)!}{p!}$$

where |m| is the number of 1s in the mask m. As described above, the mask m is based on p−1 variables, so the expression (p−|m|−1) is the number of zeroes in the mask on p−1 variables. The p! in the denominator normalizes the weights. The intuition of the weights is that the instances z that are closer to the original $x_{t_0}$ and $x_{t_1}$ instances (have more similar values with $x_{t_0}$ and $x_{t_1}$) have larger weights compared to the instances that are less similar to $x_{t_0}$ and $x_{t_1}$. This is due to the symmetric convex nature of the weights.

As discussed above, the VATS values satisfy the properties of efficiency, symmetry, linearity, and null player. In the context of variable attribution for time series, efficiency means that the sum of attributions for all dynamic variables is equal to the change in model predictions between the instance at t0 and the instance at t1. Mathematically, this is expressed as $$\Sigma_{j=1}^p \Psi_j(x_{t_0}, x_{t_1}) = \hat{f}(x_{t_1}) - \hat{f}(x_{t_0})$$

The proof that VATS values satisfy the property of efficiency follows. This proof is similar to the proof for efficiency property of the original Shapley values, which is not discussed in this application. The efficiency property of the VATS attribution is proven as follows:

The VATS value for the variable $x_j$ is defined as $$\Phi_j(x_{t_0}, x_{t_1}) = \sum_{m \in \{0,1\}^{p-1}} \frac{|m|!(p-|m|-1)!}{p!} \left[ \hat{f}(z(m_{\{j=1\}})) - \hat{f}(z(m_{\{j=0\}})) \right]$$

The VATS values are summed for all variables and the terms for these two instances are separated:

$z(m_{\{j=1\}}) = x_{t_1}$ which is the case when the set m contains all 1s $z(m_{\{j=0\}}) = x_{t_0}$ which is the case when the set m contains all 0s Thus $$\sum_{j=1}^{p} \Phi_j(x_{t_0}, x_{t_1}) =$$

$$\sum_{j=1}^{p} \sum_{m \in \{0,1\}^{p-1}} \frac{|m|!(p-|m|-1)!}{p!} \left[ \hat{f}(z(m_{\{j=1\}})) - \hat{f}(z(m_{\{j=0\}})) \right] ==$$

$$\hat{f}(x_{t_1}) \sum_{j=1}^{p} \frac{(p-1)!}{p!} + \sum_{0<|m|<p} \hat{f}(z(m)) * \left[ \frac{(|m|-1)!(p-|m|)!}{p!} |m| - \right.$$

$$\left. \frac{|m|!(p-|m|-1)!}{p!}(p-|m|) \right] - \hat{f}(x_{t_0}) \sum_{j=1}^{p} \frac{(p-1)!}{p!} ==$$

$$\hat{f}(x_{t_1}) + \sum_{0<|m|<p} \hat{f}(z(m)) * 0 - \hat{f}(x_{t_0}) = \hat{f}(x_{t_1}) - \hat{f}(x_{t_0})$$

In the formula above, except the cases when m is full or empty, all other cases appear with both positive and negative sign. As a result, they cancel each other out.

The properties of Symmetry, Linearity, and Null Player are defined as follows.

Symmetry: if $v(S \cup \{x_i\}) = v(S \cup \{x_j\})$ for all $S \subseteq \{x_1, x_2, \ldots, x_p\} \setminus \{x_i, x_j\}$ then $\Psi_i(x) = \Psi_j(x)$.

Linearity: If $\hat{f}_1(x)$ and $\hat{f}_2(x)$ are two models with SHAP values $\Psi_j^1(x)$ and $\Psi_j^2(x)$ then the model $f(x) = \hat{f}_1(x) + \hat{f}_2(x)$ has SHAP values $\Psi_j(x) = \Psi_j^1(x) + \Psi_j^2(x)$.

Null player: if $v(S \cup \{x_j\}) = v(S)$ then $\Psi_j(x) = 0$.

The proofs for the properties of symmetry, linearity, and null player are straightforward and a person of ordinary technical skill would be capable of performing them.

Two examples of how the VATS method generates variable attributions under real-world conditions are discussed below with reference to FIGS. 9 and 10. The prepayment rate of mortgage loans is a key factor in Mortgage-Backed Securities (MBS) valuations. Prepayments are a key driver of Net Interest Income (NII) and Top-of-House (TOH) rate risk metrics. An accurate forecast of prepayments also results in a more accurate NII and amortization expense projection in a balance sheet outlook. Prepayment modeling of MBS helps to more accurately assess the relative value of investment options.

FIG. 8 illustrates a complex neural network model for predicting prepayments for MBS. It is not necessary to be familiar with the internal details of the neural network model in order to understand the applicability or effectiveness of the VATS method. However, the model of FIG. 8 is presented to illustrate that, even when some internal details are known, high complexity interferes with interpretability of the model. The VATS method is applicable to both "black box" models with unknown internal details, and models with known internal details, especially those with high complexity.

In this particular example, the machine learning prepayment model may have 110 nodes at the input layer 801 configured to receive 110 input variables or drivers. The input variables include dynamic variables 802 and static variables 803. Dynamic variables may change from one time to another, and static variables remain constant over time. Input variables may have complex interactions 804 and hidden layers 805 within the neural network. This means that a change in one variable may affect how the model responds to other variables. In other words, the variables are not orthogonal to each other. Neural network models may provide a more accurate model for these complex problems with dynamic interactions between variables at the cost of diminished interpretability. However, the VATS method described above provides a method of determining how changes in input variables contribute to changes in the predicted prepayment at the output 806 of the neural network. The output 806 of this model is a conditional prepayment rate (CPR), which is a debt prepayment rate representing the debt pool's principal that neural network model of FIG. 8 predicts will be paid off ahead of schedule.

Figure 9:
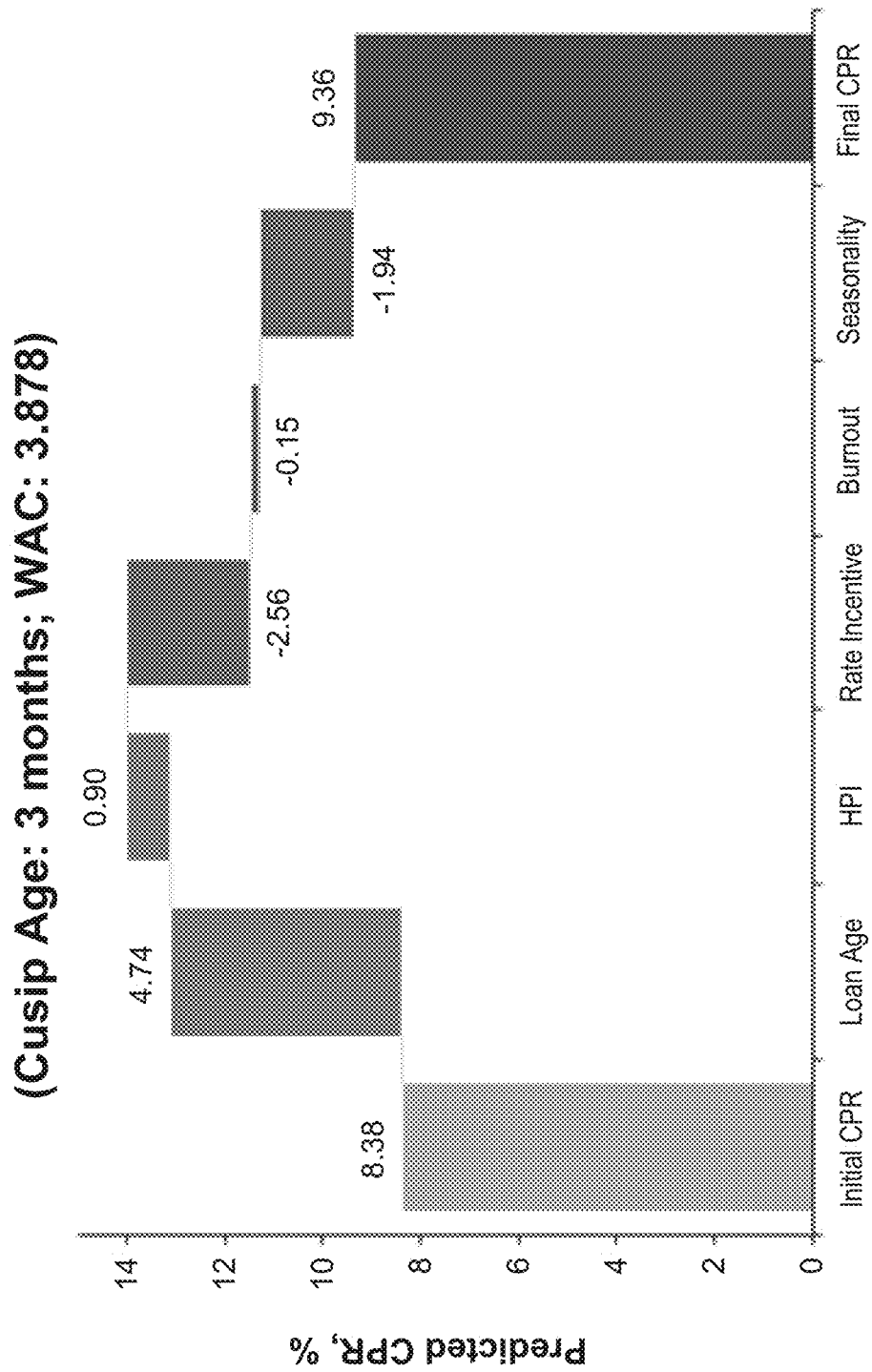
FIG. 9 is a chart showing variable attributions generated for a complex mortgage backed securities model according to embodiments disclosed herein.

Referring now to FIG. 9, the chart shows an initial CPR, modeled for July 2016, and final CPR, modeled for July 2017. What the initial CPR and final CPR model do not tell us is how each category of dynamic variables affected the change in CPR between July 2016 and July 2017. Some educated guesses can be made about the general direction, up or down, that each dynamic variable category will have on the CPR. Prepayment increases initially with loan age (seasoning effect), then after 40-50 months, prepayment decreases with loan age. As this is a new pool (3-months as of July 2016), the prepayment speed should increase with the loan age. Prepayment also increases as house prices increase. Home prices appreciated slightly from July 2016-January 2017. Therefore, there should be an increase in the prepayment speed driven by the change in HPI.

Increases in rate Incentive, defined as the difference between current mortgage rates and mortgage rates at origination and current mortgage rates, lead to increased prepayment. Mortgage rates increased during the observed period between July 2016 and July 2017, which led to a decrease of the rate incentive, so the predicted prepayment should decrease in response to the change in rate incentive. Prepayment tends to decrease in response to burnout, or missed refinancing opportunities. An increase in burnout over the modeled period should contribute to a decrease in prepayment. Seasonality also affects prepayment, with increases during summer and decreases during winter. During the observed period the season changed from summer to winter, therefore the prepayment should decrease.

Although we have a general idea of how the various drivers, or variables, should affect prepayment, we don't know the magnitude of those effects. Applying the VATS method, described above, generates a quantitative representation of the attribution of each category of dynamic variables to the overall change in CPR between July 2016 and July 2017. Referring again to FIG. 9, the VATS method identifies an attribution of +4.74 for loan age, +0.90 for HPI, −2.56 for rate incentive, −0.15 for burnout, and −1.94 for seasonality. Each of these attributions sums to the total difference between the initial CPR and the final CPR. According to an embodiment, a method of determining variable attribution in time series models may display the determined attribution for one or more of the variables of loan age, HPI, rate incentive, burnout, and seasonality. The display of these variable attributions may comprise a chart similar to FIG. 9.

One useful property of the attributions generated by the VATS method is linearity, which means that the sum of attributions in two or more models is equal to the attribution of that variable for the sum of the two or more models. The practical implication of this property is that VATS values can be generated for each CUSIP in an entire portfolio and summed to produce the variable attributions for the entire portfolio. This is illustrated in FIG. 10, which charts the VATS variable attributions for each CUSIP in an investment portfolio for the same time period as above, July 2016 to July 2017. The attributions were weighted by current MBS balance and aggregated to obtain variable attribution for the entire investment portfolio.

Figure 10:
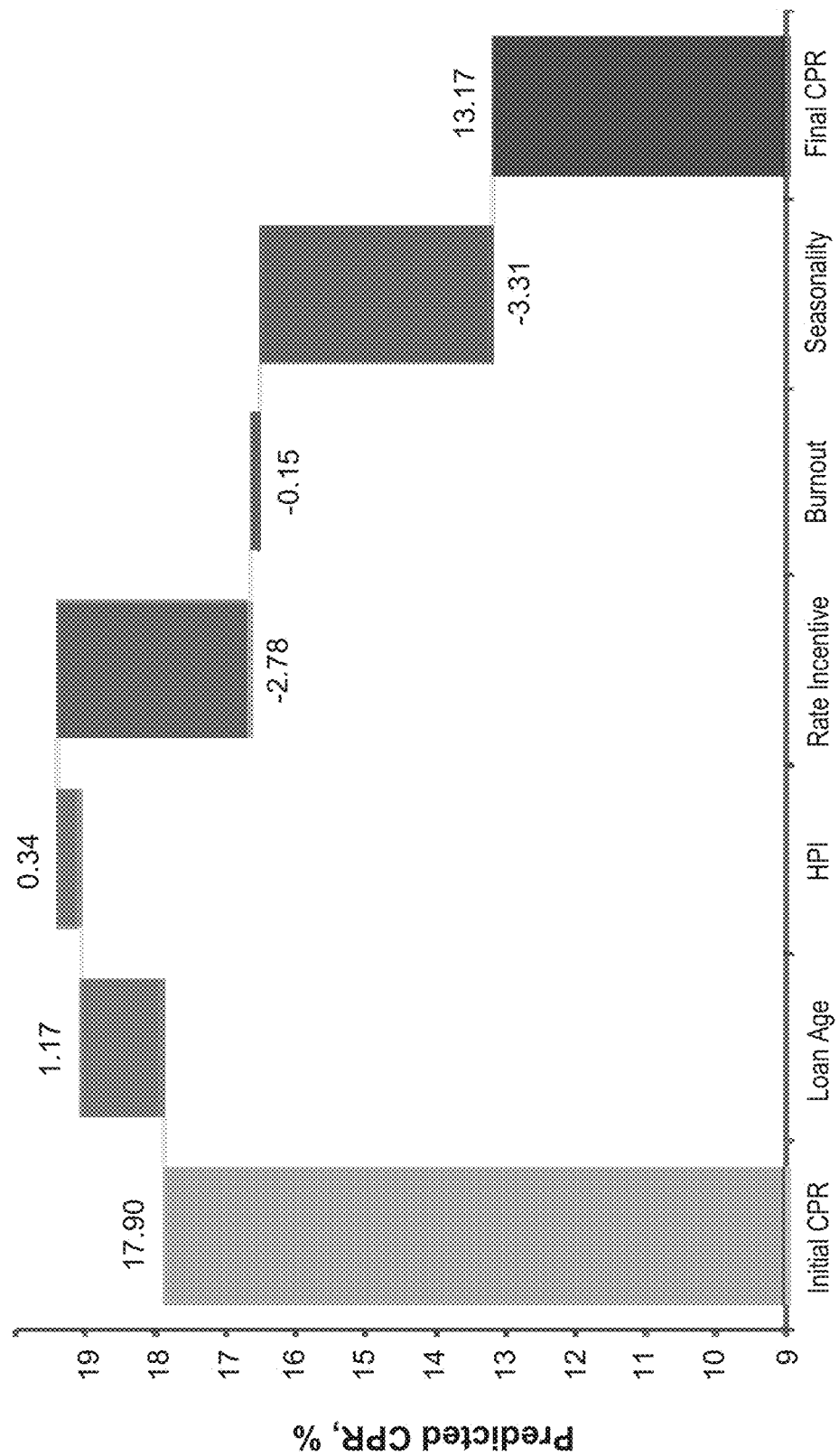
FIG. 10 is a chart showing variable attributions generated for a complex mortgage backed securities model and summed to produce variable attributions for an entire portfolio, according to embodiments disclosed herein.

FIG. 10 illustrates another example of the calculation and display of variable attributions in time series models according to an embodiment. Referring to FIG. 10, a CPR increase of 1.17 is attributed to loan age, an increase of 0.34 is attributed to changes in HPI, a decrease of 2.78 is attributed to rate incentive changes, a decrease of 0.15 is attributed to burnout, and a decrease of 3.31 is attributed to seasonality. Again, the sum of all attributions is equivalent to the total difference between initial CPR and final CPR.

Figure 11:
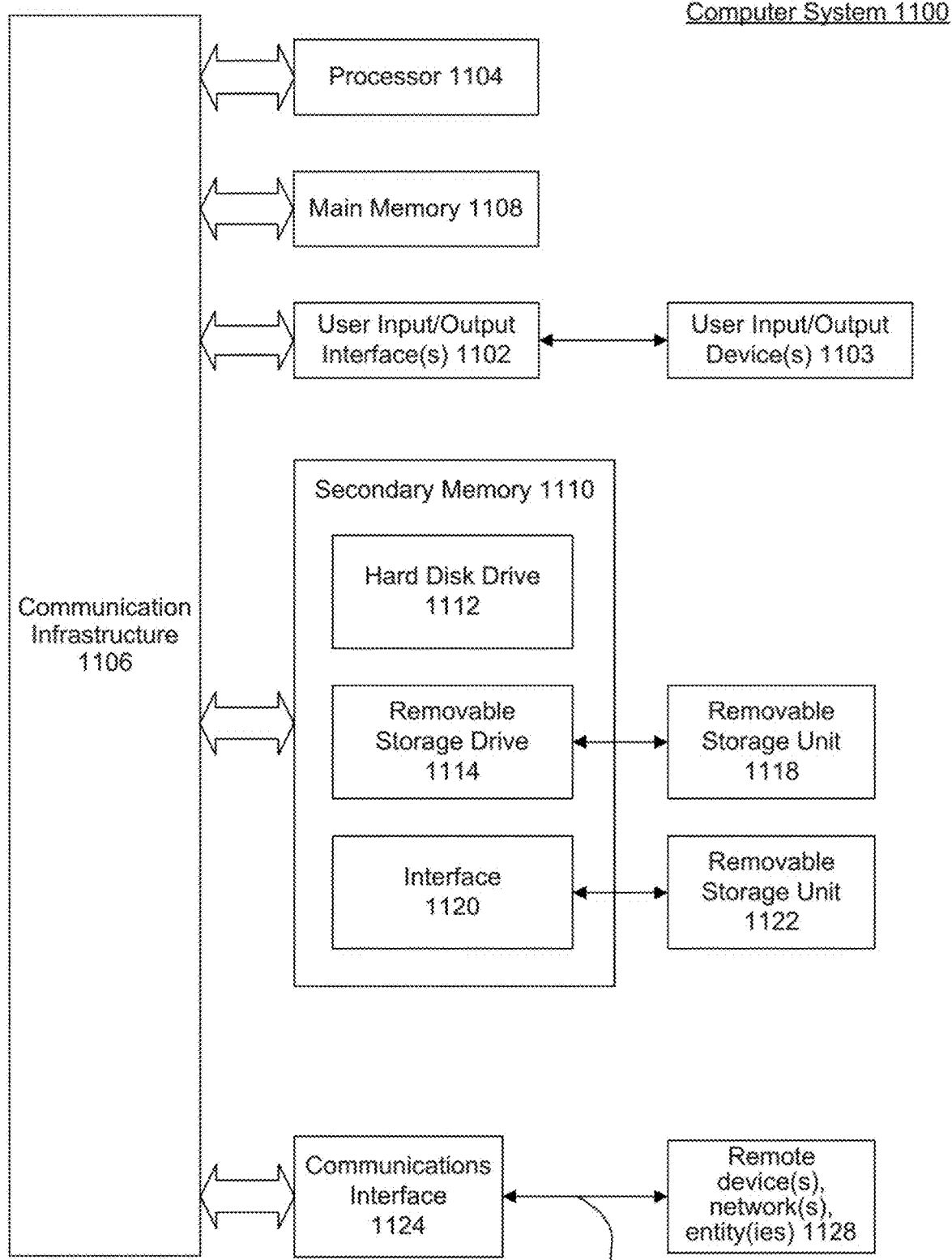
FIG. 11 depicts an example computer system useful for implementing various embodiments disclosed herein.

FIG. 11 depicts an example computer system useful for implementing various embodiments.

Various embodiments may be implemented, for example, using one or more well-known computer systems, such as computer system 1100 shown in FIG. 11. One or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, displays, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache and/or registers. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/or any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

Figure 12:
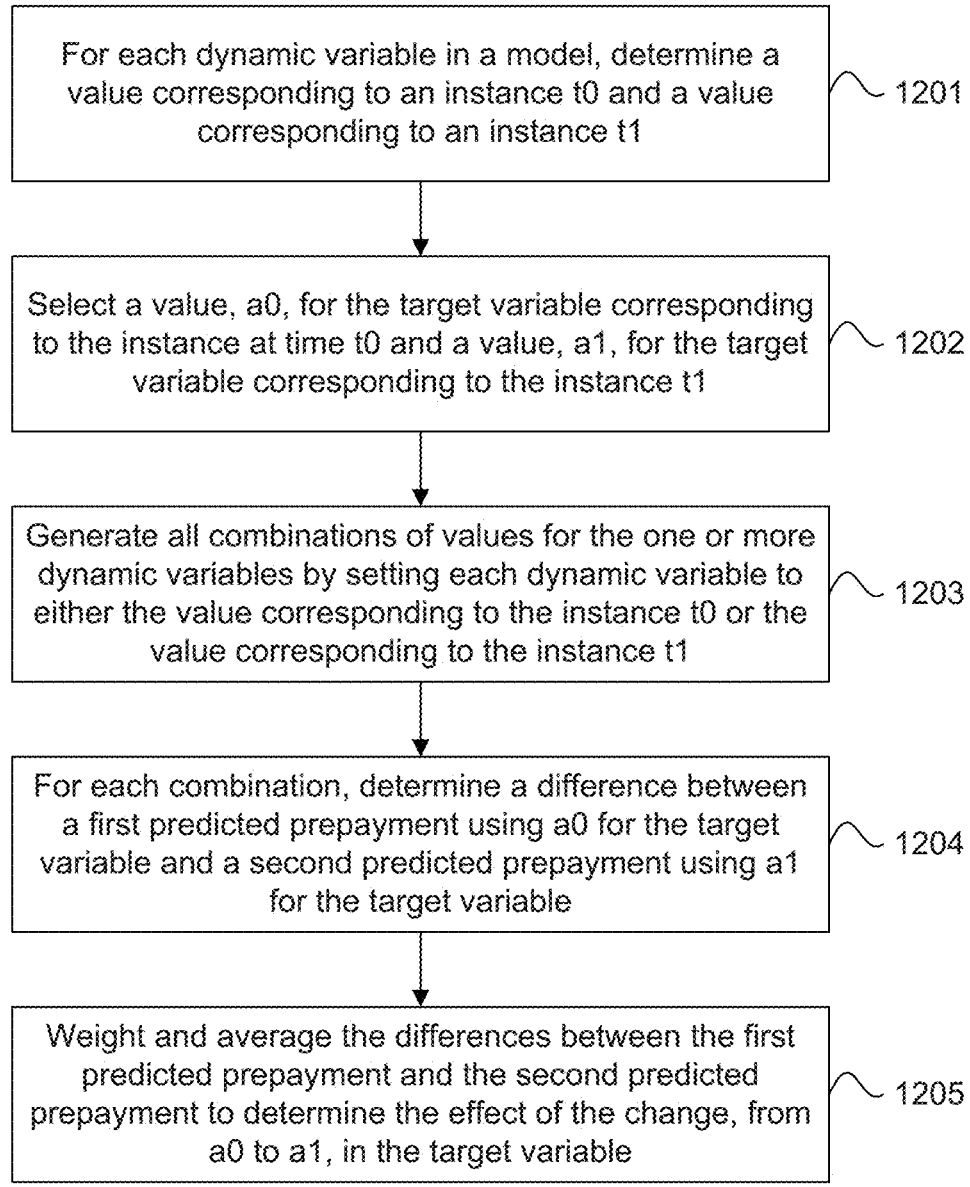
FIG. 12 is a flowchart of a method of determining variable attribution for outputs of a time series model according to embodiments disclosed herein.

FIG. 12 is a flowchart of a method of determining variable attribution for outputs of a time series model according to embodiments disclosed herein. As an example, the method of FIG. 12 is explained with reference to determining variable attribution for predicted prepayment in a time series model of pooled debt securities. The method steps of FIG. 12 may be performed by a processor and memory or by a computer depicted in FIG. 11.

At step 1201, the processor determines a value corresponding to t0 and a value corresponding to t1 for each dynamic variable in the time series model. The values of each dynamic variable corresponding to t0 and t1 may be drawn from historical data, or from simulations. The notation t0 and t1 refers to the variable values corresponding to an instance of the model at time t0 and t1. Thus, the variable values for t0 will be the variable values corresponding to the model instance at time t0 and the values for t1 will be the variable values corresponding to the model instance at time t1.

At step 1202, the processor selects, as the change in the target variable, a value, a0, of the target variable corresponding to t0 and a value, a1, of the target variable corresponding to t1. The change in the target variable is the difference between the value of the target variable at t1 and the value of the target variable at t0.

At step 1203, the processor generates all combinations of values for the one or more dynamic variables by setting each dynamic variable to either the value corresponding to t0 or the value corresponding to t1. For example, if there are 3 dynamic variables, {b, c, d}, then the set of all combinations would include the combination where all dynamic variables have the value from t0; another combination would have all the variables taking the value from t1. The set of all combinations would also include those combinations where just one of the three variables takes the variable's value from t1, while the other two take their values from t0; and those combinations where two of the three variables take their values from t1 while the remaining one variable takes its value from t0. The total number of combinations for a set of n dynamic variables is $2^n$ unique combinations. The value for the target variable may be left undetermined for each of these combinations until step 1204.

At step 1204, for each combination generated in step 1203, the processor determines a difference between a first predicted prepayment of the time series model using the value a0 for the target variable and a second predicted prepayment of the time series model using the value a1 for the target variable. The only difference between the first predicted prepayment and the second predicted prepayment is the value, a0 or a1, which the target variable takes. The remaining variable values come from one of the combinations generated in step 1203.

At step 1205, the processor averages the differences between the first predicted prepayment and the second predicted prepayment for each combination to obtain the effect of the change in the target variable. Averaging may include weighting each difference. The weights may be selected so that the variable attributions satisfy four properties: efficiency—the sum of variable attributions is equal to the change in predicted prepayment; symmetry—two variables with the same contributions in all combinations have the same attribution; linearity the sum of a variables attributions in two or more different models is equal to that variable's attribution for the sum of the models; and null player—a variable with zero contributions in all combinations has zero attribution. In order to satisfy these properties, the weighting may be performed according to the formula $$\frac{|m|!(p-|m|-1)!}{p!}$$

where |m| is the number of variables that take a value from t1, p is the total number of the dynamic variables and the target variable, and (p−|m|−1) is the number of variables that take a value from t0.

Figure 13:
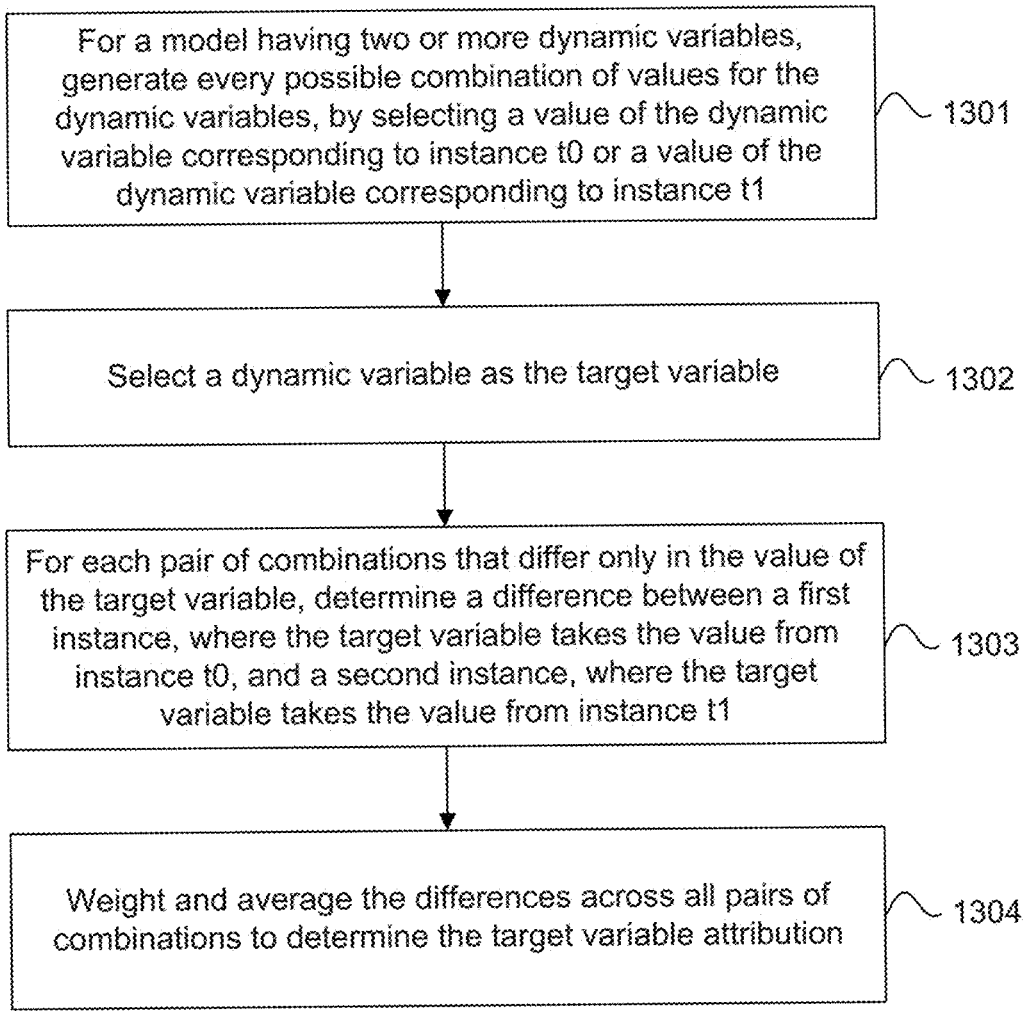
FIG. 13 is a flowchart of a method of determining variable attribution for a discrete series model according to embodiments disclosed herein.

FIG. 13 is a flowchart of a method of determining variable attribution for a discrete series model according to embodiments disclosed herein. The method of FIG. 13 is more general than the method of FIG. 12, and can be used to determine the attribution of all dynamic variables in a discrete series model with two or more dynamic variables. FIG. 13 treats the target variable as one of the dynamic variables. The method steps of FIG. 13 may be performed by a processor and memory or by a computer depicted in FIG. 11.

At step 1301, the processor, generates a set of combinations including every possible combination of values for the two or more dynamic variables, where a value for each dynamic variable is selected from a value of the dynamic variable corresponding to instance t0 or a value of the dynamic variable corresponding to instance t1.

At step 1302, the processor selects a target variable from among the two or more dynamic variables. Any of the dynamic variables may be selected as the target variable. Variable attributions for all of the target variables may be determined by selecting each of the dynamic variables, in turn, as the target variable and performing steps 1303 and 1304 with that variable selected as the target variable.

At step 1303, for each pair of combinations that differ only in the value of the target variable, the processor determines a difference between a first instance, where the target variable takes a value from instance t0, and a second instance, where the target variable takes a value from instance t1. Because each variable can take on one of two possible values, the number of combinations generated is $2^n$ when n is a number of variables greater than zero. Because $2^1$ equals 2, and each additional variable doubles the number of combinations, the number of combinations generated is always even. When a dynamic variable is selected as the target variable, the combinations will also group into pairs of combinations, or instances, where every variable value in the pair of combinations is the same except for the value of the target variable.

In step 1304, the processor averages the differences between the first instance and the second instance, where the variable values differ only in the value of the selected target variable, across all pairs of combinations to determine the target variable attribution. The averaging of the differences may including weighting each difference so that the variable attributions satisfy four properties: efficiency—the sum of variable attributions is equal to the change in predicted prepayment; symmetry—two variables with the same contributions in all combinations have the same attribution; linearity—the sum of a variable's attributions in two or more different models is equal to that variable's attribution for the sum of the models; and null player—a variable with zero contributions in all combinations has zero attribution. In order to satisfy these properties, the weighting may be performed according to the formula $$\frac{|m|!(p-|m|-1)!}{p!}$$

where $|m|$ is the number of variables that take a value from t1, p is the total number of the dynamic variables and the target variable, and $(p-|m|-1)$ is the number of variables that take a value from t0.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of determining an effect, on a time series prepayment model prediction, of a change in a target variable between a first instance in time and a second instance in time, the time series prepayment model including the target variable and one or more dynamic variables that change between the first instance in time and the second instance in time, the method comprising:
   determining, using one or more processors, a first value corresponding to the first instance in time and a second value corresponding to the second instance in time for each dynamic variable in the time series prepayment model;
   selecting, using the one or more processors, a first value of the target variable corresponding to the first instance in time and a second value of the target variable corresponding to the second instance in time, wherein a change in the target variable comprises a difference between the first value of the target variable and the second value of the target variable;
   generating, using the one or more processors, all combinations of values for the one or more dynamic variables by setting each dynamic variable to either the first value corresponding to the first instance in time or the second value corresponding to the second instance in time;
   for each combination, generating, using the time series prepayment model, a first model prediction of the time series prepayment model using the first value of the target variable and a second model prediction of the time series prepayment model using the second value of the target variable;
   for each combination, determining, using the one or more processors, a difference between the first model prediction and the second model prediction; and
   averaging, using the one or more processors, the differences between the first model prediction and the second model prediction for each combination to obtain an effect of the change of values corresponding to the first instance in time and the second instance in time of the target variable by weighing each difference and summing the weighted differences to obtain the effect of the change in the target variable,
   wherein the weighing of each difference comprises weighing each difference such that:
   a sum of the effect of the change in the target variable and effects of changes in each of the one or more dynamic variables is equal to a total change in model prediction between the first instance in time and the second instance in time, and
   a sum of any of the one or more dynamic variable's effects, in each of multiple time series prepayment models, is equal to an effect of that dynamic variable for a sum of the multiple time series prepayment models.

2. The method of claim 1, wherein the time series prepayment model includes one or more static variables that do not change between the first instance in time and the second instance in time and the method further comprises:
   excluding, from the generating of all combinations, static variables that do not change between the first instance in time and the second instance in time.

3. The method of claim 1, wherein the first model prediction comprises a predicted prepayment in a time series prepayment model of pooled debt securities.

4. The method of claim 1, further comprising displaying a representation of the effect of the change of values corresponding to the first instance in time and the second instance in time of the target variable in conjunction with one or more effects of the one or more dynamic variables.

5. The method of claim 1, wherein the weighing of each difference comprises weighing each difference such that:
the effect of the change in the target variable is equal to an effect of a change in another dynamic variable of the one or more dynamic variables when, for each combination, the difference between a first model prediction of the time series prepayment model using the first value corresponding to the first instance in time for the other dynamic variable and a second model prediction of the time series prepayment model using the second value corresponding to the second instance in time for the other dynamic variable is equal to that of the target variable; and
the effect of the target variable is zero when the change in the target variable produces zero change in the model prediction of the time series prepayment model.

6. A system for determining a target variable's attribution to a prediction change between two instances, a first instance and a second instance, of a discrete series model including the target variable and one or more dynamic variables that change between the first instance and the second instance, the system comprising:
a memory configured to store operations; and
a processor coupled to the memory and configured to perform the operations comprising:
determining a value corresponding to the first instance and a value corresponding to the second instance for each dynamic variable in the discrete series model;
selecting a first value of the target variable corresponding to the first instance and selecting a second value of the target variable corresponding to the second instance;
generating all combinations of values for the one or more dynamic variables by setting each dynamic variable to either the value corresponding to the first instance or the value corresponding to the second instance;
for each combination of values for the one or more dynamic variables, generating, using the discrete series model, a first prediction using the first value for the target variable and a second prediction using the second value for the target variable;
for each combination of values for the one or more dynamic variables, determining a contribution comprising a difference between the first prediction and the second prediction; and
averaging the contributions to obtain the target variable's attribution by weighing each difference and summing the weighted differences to obtain the target variable's attribution,
wherein the weighing of each difference comprises weighing each difference such that:
a sum of attributions for the target variable and attributions for all dynamic variables is equal to the prediction change between the first instance and the second instance, and
among the one or more dynamic variables, the sum of one dynamic variable's attributions for two or more models is equal to an attribution of the dynamic variable for the sum of the two or more models.

7. The system of claim 6, wherein the discrete series model includes one or more static variables that do not change between the first instance and the second instance and the operations further comprise:
excluding, from the generating of all combinations, static variables that do not change between the first instance and the second instance.

8. The system of claim 6, further comprising an output device, wherein the operations further comprise displaying a representation of an effect of a change in the target variable in conjunction with one or more effects of the one or more dynamic variables on the output device.

9. The system of claim 6, wherein the operations further comprise:
weighing each difference such that:
two of the one or more dynamic variables with equal contribution to the prediction of the discrete series model for all the combinations have equal attributions; and
attribution of a dynamic variable of the one or more dynamic variables is zero when a sum of contributions of the dynamic variable for all combinations is zero.

10. The system of claim 6, wherein the discrete series model comprises a time series model.

11. A method of determining an effect of a target variable on a change in a machine learning model prediction between a first instance of time and a second instance of time, the machine learning model comprising two or more dynamic variables that change between the first instance of time and the second instance of time, the method comprising:
determining a value corresponding to the first instance of time and a value corresponding to the second instance of time for each dynamic variable in the machine learning model;
generating all combinations of values for the two or more dynamic variables by setting each dynamic variable to either the value corresponding to the first instance of time or the value corresponding to the second instance of time;
selecting a dynamic variable among the two or more dynamic variables as a target variable;
creating pairs of instances with a first instance of each pair having a combination of values with a value of the target variable corresponding to the first instance of time and a second instance of each pair having a combination of values with a value of the target variable corresponding to the second instance, with each other dynamic variable having the same randomly selected value corresponding to the first instance of time or the second instance of time;
for each pair of instances, using the machine learning model to generate a first model prediction for the first instance and a second model prediction for the second instance;
for each pair of instances, determining a contribution comprising a difference between the first model prediction and the second model prediction; and
averaging the contributions to obtain the effect of the target variable by weighing each difference and summing the weighed differences to obtain the effect of the target variable,
wherein the weighing of each difference comprises weighing each difference such that:
a sum of the effect of the target variable and effects of each of the one or more dynamic variables is equal to a total change in model prediction between the first instance of time and the second instance of time, and
a sum of any of the one or more dynamic variable's effects, in each of multiple time series prepayment models, is equal to an effect of that dynamic variable for a sum of the multiple time series prepayment models.

12. The method of claim 11, wherein the model comprises one or more static variables that do not change between the first of time and the second instance of time and the method further comprises:
excluding, from the generating of all combinations, static variables that do not change between the first of time and the second instance of time.

13. The method of claim 11, further comprising displaying a representation of the effect of the target variable in conjunction with one or more effects of the one or more dynamic variables.

14. The method of claim 11, wherein the weighing of each difference comprises weighing each difference such that:
the effect of the target variable is equal to an effect of another dynamic variable of the one or more dynamic variables when, for each combination, a contribution of the dynamic variable is equal to the contribution of the target variable; and
the effect of the target variable is zero when a change in the target variable produces zero change in the model prediction.

15. A non-transitory computer-readable storage device storing instructions, execution of which, by one or more processors, causes the one or more processors to perform a method of determining a target variable attribution corresponding to a change in output of a discrete series model including two or more dynamic variables that vary between a first instance of time and a second instance of time, the method comprising:
generating a set of combinations including every possible combination of values for the one or more dynamic variables, excluding any static variables that do not change between the first instance of time and the second instance of time, where a value for each dynamic variable is selected from a value of the dynamic variable corresponding to the first instance of time or a value of the dynamic variable corresponding to the second instance of time;
selecting a target variable from among the two or more dynamic variables;
for each pair of combinations that differ only in a value of the target variable, using the discrete series model to generate a first model prediction from a first combination of the pair where the target variable takes a value from the first instance of time and a second model prediction from a second combination of the pair where the target variable takes a value from the second instance of time;
for each pair of combinations that differ only in a value of the target variable, determining a contribution comprising a difference between the first model prediction and the second model prediction; and
averaging the contributions across all pairs of combinations to determine the target variable's attribution by weighing each difference and summing the weighted differences to obtain the effect of a change in the target variable,
wherein the weighing of each difference comprises weighing each difference such that:
a sum of the target variable attribution and attributions of each of the one or more dynamic variables is equal to a total change in output between the first instance of time and the second instance of time, and
a sum of any of the one or more dynamic variable's effects, in each of multiple discrete series models, is equal to an effect of that dynamic variable for a sum of the multiple discrete series models.

16. The non-transitory computer-readable storage device of claim 15, wherein the weighing of each difference comprises weighing each difference such that:
the target variable attribution is equal to an attribution of another dynamic variable of the one or more dynamic variables when, for each pair of combinations, a contribution of the other dynamic variable is equal to the contribution of the target variable; and
the target variable attribution is zero when a sum of contributions of the dynamic variable for all combinations is zero.

* * * * *